(12) United States Patent　　(10) Patent No.:　　US 9,471,814 B2
Powell　　(45) Date of Patent:　　Oct. 18, 2016

(54) READER AND METHOD FOR READING DATA

(75) Inventor: George L. Powell, Canning Vale (AU)

(73) Assignee: ANDEXOR PTY LTD., Canning Vale (AU)

( * ) Notice: Subject to any disclaimer, the term of this patent is extended or adjusted under 35 U.S.C. 154(b) by 579 days.

(21) Appl. No.: 13/881,863

(22) PCT Filed: Oct. 25, 2011

(86) PCT No.: PCT/AU2011/001370
§ 371 (c)(1),
(2), (4) Date: Jun. 20, 2013

(87) PCT Pub. No.: WO2012/054974
PCT Pub. Date: May 3, 2012

(65) Prior Publication Data
US 2013/0271266 A1　　Oct. 17, 2013

(30) Foreign Application Priority Data
Oct. 26, 2010　(AU) ................................ 2010904767

(51) Int. Cl.
G06K 7/00　　(2006.01)
G06K 7/10　　(2006.01)
H04L 25/49　　(2006.01)

(52) U.S. Cl.
CPC ......... G06K 7/0008 (2013.01); G06K 7/10029 (2013.01); H04L 25/4917 (2013.01)

(58) Field of Classification Search
CPC ........... G06K 7/10029; G06K 7/0008; G06K 7/10019; H04L 25/4917
USPC .................................... 340/10.1, 10.2, 572.1
See application file for complete search history.

(56) References Cited

U.S. PATENT DOCUMENTS

| | | | |
|---|---|---|---|
| 5,648,765 A | 7/1997 | Cresap et al. | |
| 7,116,212 B2 | 10/2006 | Horwitz et al. | |
| 2007/0222560 A1* | 9/2007 | Posamentier | G06K 7/0008 340/10.2 |
| 2008/0088416 A1 | 4/2008 | Crooks et al. | |
| 2009/0033466 A1 | 2/2009 | Song et al. | |
| 2010/0039233 A1 | 2/2010 | Niedzwiecki et al. | |
| 2011/0121949 A1* | 5/2011 | Guo | H04W 72/1257 340/10.2 |

OTHER PUBLICATIONS

International Search Report issued in PCT/AU2011/001370 on Dec. 24, 2011.
Written Opinion issued in PCT/AU2011/001370 on Dec. 14, 2011.
Samano-Robles et al., "Collision Resolution Algorithms for RFID Applications," Instituto de Telecomunicações.

(Continued)

*Primary Examiner* — Nabil Syed
(74) *Attorney, Agent, or Firm* — Marshall, Gerstein & Borun LLP

(57) ABSTRACT

A reader (112) for reading a plurality of data, wherein each data in the plurality of data is associated with a respective source (16) and is carried by a respective data signal originating from the respective source (16), the reader (112) comprising processing means (118) and a storage means, the storage means having instructions stored thereon, whereby the processing means (118) is operable, under control of the instructions, to: receive and store in the storage means a representation of a combination of the respective data signals; process the representation to determine one or more data signals of the combination of the respective data signals of the representation; and to read the data of the determined one or more data signals.

34 Claims, 5 Drawing Sheets

(56) References Cited

OTHER PUBLICATIONS

Samano-Robles et al., "A Contention Binary Tree Algorithm Assisted by Source Separation," School of Electronic and Electrical Engineering, University of Leeds.

Search and Advisory Service Search Report issued by the UK Intellectual Property Office regarding Australian Pat. Appl. No. 2010904767 on Nov. 23, 2010.

Patent Examination Report No. 1 issued in Australian Patent Application No. 2011320020 on Jun. 25, 2014.

* cited by examiner

Typical Encoded Tag Data Waveform

Exaggerated effect of limited frequency response and capacitive coupling

READER AND METHOD FOR READING DATA

TECHNICAL FIELD

The present invention relates generally to a reader and method for reading data.

Although the present invention will be described with particular reference to anti-collision in a radio frequency identification ("RFID") system utilising ordinary RFID tags, it will be appreciated that the present invention may be used in any system to read a plurality of data, wherein each data in the plurality of data is associated with a respective source and is carried by a respective data signal originating from the respective source.

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

Additionally, throughout the specification, unless the context requires otherwise, the words "substantially" or "about" will be understood to not be limited to the value for the range qualified by the terms.

BACKGROUND ART

Each document, reference, patent application or patent cited in this text is expressly incorporated herein in their entirety by reference, which means that it should be read and considered by the reader as part of this text. That the document, reference, patent application, or patent cited in this text is not repeated in this text is merely for reasons of conciseness.

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

RFID involves readers (also referred to as interrogators) and tags (also referred to as cards or labels). RFID tags are devices operable to send data such as, for example, an identification (a "tag ID") to an RFID reader for identification purposes.

In operation, a reader will attempt to communicate with one or more tags within the reader's transmission area or field. The reader is operable to transmit a predetermined signal (in the transmission area or field) and then monitors the signal. Tag(s) responding to the signal are operable to modulate it in a predetermined manner which is identified by the reader.

FIG. 1 of the drawings depicts a conventional arrangement of an RFID system 10 comprising a typical low frequency (125 KHz) RFID reader 12 having a tuned loop reader antenna 14 operable to receive a response signal from a typical tag 16. FIGS. 2A and 2B of the drawings depict simplified block diagrams for the reader 12 and the tag 16, respectively.

The reader 12 comprises a reader microprocessor 18 operable to provide a stable 125 KHz reference frequency from an onboard pulse-width modulation ("PWM") output. This is amplified by an un-modulated RF reader amplifier 20 and used to power the reader antenna 14 at a frequency of 125 KHz. Current in the loop of the reader antenna 14 generates an inductive alternating current ("AC") field around the loop. Also connected to the loop of the reader antenna 14 is an envelope detector 22, the simplest of which may have the form of a diode detector. Output from the envelope detector 22 is presented to a detector amplifier 24. This is depicted in FIG. 2A as being operably connected or going to an analogue-to-digital converter ("ADC") 26, but its output could be taken to a comparator in simple readers. The components of the reader 12 are operably connected such that any signal modulation that appears on the tuned loop of the reader antenna 14 will be detected and amplified.

The tag 16 comprises a tuned loop tag antenna 28 operably coupled to a tuned circuit. A tag rectifier 30 is provided and is operable to tap off some of the power in the tuned circuit to power or run a tag microchip 32. The tag 16 further comprises a clock extractor 34 operable to divide the RF frequency by a factor, which may be, for example, 32, to provide an output data rate, a 64 bit shift register 36 containing the tag data, and a tag modulator 38 operable to modulate the tuned loop of the tag antenna 28. When the tag 16 is placed in an RF field (such as the transmission area or field) generated by the reader 12, a voltage on the tuned circuit of the tag 16 increases or builds up until the tag rectifier 30 is operable to supply enough power for the tag microchip 32 to work or function, that is energise the tag 16. A typical tag will have 64 bits of stored data in the shift register 36, although there are many different tags available with memories storing varied amounts of data from just a few bits to many thousands of bits. For a better understanding, the tag may use the clock extractor 34 to divide down the 125 KHz frequency by 32 and use this as a reference frequency. Typically this reference frequency can be used as a clock to rotate the shift register 36 containing the tag data, such as the tag ID. The shift register 36 is arranged to rotate the 64 bits of data around and around in a continuous loop. A serial output of the shift register 36 is used to modulate RF voltage on the receiver coil of the tag 16. The data is usually converted into Manchester or Bi-phase encoding to ensure that the signal has no direct current ("DC") component. A typical waveform in this regard is depicted in FIG. 3 of the drawings.

The tuned loop of the tag antenna 28 is coupled into the tuned loop of the reader antenna 14 such that the modulation of the tag 16 also appears on the tuned loop of the reader antenna. This modulated signal can be several tens of μV to several tens of mV depending on the distance between the tag 16 and the reader 12. By operation of the envelope detector 22 and detector amplifier 24 of the reader 12, the signal is detected and amplified and presented to the ADC 26 and then subsequently to the microprocessor 18. Many microprocessors have internal ADCs. In a normal or traditional (non-anti-collision system) tag reader, the analogue to digital is used to detect when the signal is positive or negative compared to a no signal voltage, allowing for the received tag data to be decoded back, from the encoded Manchester code, for example, to raw data. Many readers also use a standard integrated circuit ("IC") comparator in this position and present the output to a microprocessor port for decoding and processing.

Often the detected signal is amplified until it limits, rail to rail, and this can make detection easier. Typically the received waveform can be compared to a centre rest voltage with a comparator or digitally using an ADC and subtracting samples. The timings between switching are compared and the associated bit, '0' or '1', chosen that corresponds best to the particular encoding of the tag data.

As a general rule, an RFID system such as that described above works well. Cards or tags and readers are typically inexpensive and to date, this system is the widest in use of all card/tag systems and is used for many applications, including asset tracking, door entry, logistics, and maintenance.

However, this setup will fail if several cards or tags are in the field of the reader at the same time because modulations are overlaid and corrupted and possibly no card will be read at all.

If there are several tags in the field but one tag has more modulation than the others combined then the data of this, the dominant tag, may still be read by the reader because the other tags only have a limited influence. Such a case is depicted in FIG. 4 of the drawings. In the case depicted, a second tag B is in a field of a reader with another tag A of lesser modulation. It can be seen that using a comparator with one input set to a mid way voltage and the other connected to the output of a signal amplifier the comparator will give an output exactly according to Tag B. Once again, the timings between the switching points can be compared with the timings for encodings for '0' and '1' and the appropriate data bit selected. The data of tag A will not be read. In this example only a single tag can be read. However, if there are, for example, three tags contributing signal strengths having magnitudes of say 4, 3 and 2, then despite the fact that the tag with the contribution of 4 is making a larger signal contribution than any other single tag, its signal contribution is still smaller than the combined contributions of the other two tags (3+2) and none of the three tags will be able to be read by the system. The system may also break down, that is fail to make a reading, if there are two tags of equal signal contribution because the data can cancel, as depicted in FIG. 9 of the drawings. This system can have the advantage, at least for a single tag, of having long read range.

A reader employing an ADC would do the same thing in digital form by comparing the samples with the centre voltage. The higher the sample rate the better, but a sample rate of 5 times the data rate will be adequate. Thus, such a system may read data from a dominant card in a plurality of cards in the reading field, and that is all.

Substantial efforts have been made to create special cards that by various means allow the data to be gathered from each card without corruption where there is a plurality of cards present in a reading field. Such cards are known as anti-collision cards.

One system addresses this problem by using a pseudo-random timing sequence in the logic of the tag so that the tag only turns on for a short time and then turns off, so that if several tags are in the same field simultaneously, the likelihood is that only one of them will be sending data while the others are disabled. In this and other similar systems it is only possible to read the data of a particular tag if it alone is the only tag that is actively transmitting. In another system, described in International Patent Application Publication No. WO/1999/067735, the cards are read by the reader using a binary search so that cards drop out if their coding is different to the coding sent out by the reader (WO/1999/067735). Major disadvantages of these and similar systems are high cost and high complexity.

Prior art anti-collision RFID systems require the reader to communicate with the tags. This is usually accomplished by turning the RF field generated by the reader on and off and the cards detect this. Many different commands can be sent to the tags as a series of '0's and '1's. Typically a reader will send a '0' to the tag as a longer or a shorter off pulse than the off pulse for a '1'. The timing of the off period for a '1' and the off period for a '0' are predetermined. It is important to note that the turning of the RF field on and off is solely to send commands or communicate with the tags. There is no other reason for the reader to turn the RF power on and off.

An anti-collision tag is a tag that has special provision to enable it to be read when several tags are in the same field at the same time.

A normal or conventional tag is an RFID tag that has no provision for anti-collision It is against this background that the present invention has been developed.

SUMMARY OF INVENTION

It is an object of the present invention to overcome, or at least ameliorate, one or more of the deficiencies of the prior art mentioned above, or to provide the consumer with a useful or commercial choice.

Other objects and advantages of the present invention will become apparent from the following description, taken in connection with the accompanying drawings, wherein, by way of illustration and example, a preferred embodiment of the present invention is disclosed.

According to a first broad aspect of the present invention, there is provided a reader for reading a plurality of data, wherein each data in the plurality of data is associated with a respective one of plurality of radio frequency identification ("RFID") tags and is carried by a respective data signal originating from the respective one of the plurality of RFID tags, the reader comprising processing means and a storage means, the storage means having instructions stored thereon, whereby the processing means is operable, under control of the instructions, to:
receive and store in the storage means a representation of a combination of the respective data signals; the combination comprising corrupted data carried by a corrupted data signal arising from a collision involving at least one data signal originating from a conventional RFID tag having no provision for anti-collision;
process the representation to determine one or more data signals of the combination of the respective data signals of the representation; the determined one or more data signals including the data signal of the at least one data signal originating from the conventional RFID tag having no provision for anti-collision; and
to read the data of the determined one or more data signals.

Preferably, the representation comprises a waveform or samples of a waveform. The samples may be digitized samples.

Preferably, the processing means is operable, under control of the instructions, to:
construct a simulation of the determined one or more data signals; subtract the simulation from the representation to generate a modified representation; and
to store the modified representation in the storage means.

Preferably, the processing means is further operable, under control of the instructions, to:
process the modified representation to determine further one or more data signals of the combination of the respective data signals of the modified representation; and to read the data of the determined further one or more data signals.

Preferably, the one or more data signals comprises a first data signal. The further one or more data signals may comprise a second data signal.

Preferably, the processing comprises determining voltage levels associated with the representation and allocating the voltage levels to a data signal associated with a respective one of the plurality of RFID tags.

Preferably, the voltage levels are determined by comparing successive analogue to digital samples or readings and/or by calculating first and second derivatives of the representation.

Preferably, the processing comprises comparison of the representation and allocating a data signal associated with a respective one of the plurality of RFID tags on the basis of the comparison.

Preferably, the comparison comprises a direct comparison of a magnitude of analogue to digital samples or readings and/or of slopes of curves/rates of change (dv/dt) associated with the representation to determine directions of multiple transitions in the time domain.

Preferably, the reader comprises a field generator operable to generate a field to activate an RFID tag to transmit a respective data signal carrying data associated with the RFID tag.

Preferably, the field generator is operable to periodically cancel and re-apply the field to alter a phase distribution of the respective data signal relative to other data signals.

Preferably, the field generator is operable to vary the periodic cancellation and re-application of the field.

Preferably, the field generator is operable to vary an amplitude of the field to alter a phase distribution of the respective data signal relative to other data signals.

Preferably, the field generator is operable to apply noise during a period in which the field is cancelled to alter a phase distribution of the respective data signal relative to other data signals.

Preferably, the RFID tags comprise any source having associated data.

Preferably, the RFID tags comprise a variation in one or more parameters affecting the respective data signals originating therefrom.

The variation in one or more parameters may comprise introducing an asymmetry into the respective data signal relative to other data signals.

The parameter may comprise a phase distribution of the respective data signal relative to other data signals.

Preferably, the parameter comprises a modulation time. In such an embodiment, the sources may exhibit or be provided with unequal modulation times so that cancellation of a respective data signal relative to one or more other data signals is inhibited to at least some extent and preferably never complete. Preferably, the representation is associated with a remnant signal remaining after the respective data signals have combined to at least partially cancel one another. The processing may comprise analyzing switching directions associated with the remnant signal to determine switching directions of the respective data signals. In this manner, the switching directions of, for example, signals associated with two partially cancelling sources may be determined.

According to a second broad aspect of the present invention, there is provided a method for reading a plurality of data, wherein each data in the plurality of data is associated with a respective one of a plurality of radio frequency identification ("RFID") tags and is carried by a respective data signal originating from the respective one of the plurality of RFID tags, the method comprising:

receiving and storing a representation of a combination of the respective data signals, the combination comprising corrupted data carried by a corrupted data signal arising from a collision involving at least one data signal originating from a conventional RFID tag having no provision for anti-collision;

processing the representation to determine one or more data signals of the combination of the respective data signals of the representation, the determined one or more data signal including the data signal of the at least one data signal originating from the conventional RFID tag having no provision for anti-collision; and reading the data of the determined one or more data signals.

Preferably, the representation comprises a waveform or samples of a waveform. The samples may be digitized samples.

Preferably, the method comprises:

constructing a simulation of the determined one or more data signals;

subtracting the simulation from the representation to generate a modified representation; and storing the modified representation in the storage means.

Preferably, the method further comprises:

processing the modified representation to determine further one or more data signals of the combination of the respective data signals of the modified representation; and reading the data of the determined further one or more data signals.

Preferably, the one or more data signals comprises a first data signal. The further one or more data signals may comprise a second data signal.

Preferably, the processing comprises determining voltage levels associated with the representation and allocating the voltage levels to a data signal associated with a respective one of the plurality of RFID tags.

Preferably, the voltage levels are determined by comparing successive analogue to digital samples or readings and/or by calculating first and second derivatives of the representation.

Preferably, the processing comprises comparison of the representation and allocating a data signal associated with a respective one of the plurality of RFID tags on the basis of the comparison.

Preferably, the comparison comprises a direct comparison of a magnitude of analogue to digital samples or readings and/or of slopes of curves/rates of change (dv/dt) associated with the representation to determine directions of multiple transitions in the time domain.

Preferably, the method comprises generating a field to activate an RFID tag to transmit a respective data signal carrying data associated with the RFID tag.

Preferably, the method comprises periodically canceling and re-applying the field to alter a phase distribution of the respective data signal relative to other data signals.

Preferably, the method comprises varying the periodic cancellation and re-application of the field.

Preferably, the method comprises varying an amplitude of the field to alter a phase distribution of the respective data signal relative to other data signals.

Preferably, the method comprises applying noise during a period in which the field is cancelled to alter a phase distribution of the respective data signal relative to other data signals.

Preferably, the RFID tags comprise any source having associated data.

Preferably, the RFID tags comprise a variation in one or more parameters affecting the respective data signals originating therefrom.

The variation in one or more parameters may comprise introducing an asymmetry into the respective data signal relative to the other data signals.

The parameter may comprise a phase distribution of the respective data signal relative to other data signals.

Preferably, the parameter comprises a modulation time. In such an embodiment, the sources may exhibit or be provided with unequal modulation times so that cancellation of a respective data signal relative to one or more other data signals is inhibited to at least some extent and preferably never complete.

Preferably, the representation is associated with a remnant signal remaining after the respective data signals have combined to at least partially cancel one another. The processing may comprise analyzing switching directions associated with the remnant signal to determine switching directions of the respective data signals. In this manner, the switching directions of, for example, signals associated with two partially cancelling sources may be determined.

According to a third broad aspect of the present invention, there is provided a reader for reading data, the reader comprising:
a field generator operable to generate a field for activating a radio frequency identification ("RFID") rag to transmit a respective data signal carrying data associated with the RFID tag;
a receiver operable to receive:
a data signal, wherein the data signal carries one or more data associated with one or more RFID tags transmitted by the one or more RFID tags being maintained substantially stationary relative to the field generator for a time period and activated by the field to transmit the data; and
a further data signal comprising a combination of the data signal and another data signal carrying data associated with one or more other RFID tags transmitted by the one or more other RFID tags being placed in the field and activated by the field to transmit the data, whilst the RFID tag is maintained substantially stationary relative to the field generator; the combination comprising corrupted date carried by a corrupted data signal arising from a collision involving at least one data signal originating from a conventional RFID tag having no provision for anti-collision;
processing means and a storage means, the storage means having instructions stored thereon, whereby the processing means is operable, under control of the instructions, to:
generate and store in the storage means a representation of the received data signal;
generate and store in the storage means a representation of the received further data signal;
process the representation of the received data signal and the representation of the received further data signal to determine the other data signal, the determined other data signal including the data signal of the at least one data signal originating from the conventional RFID tag having no provision for anti-collision; and
to read data of the determined other data signal.

Preferably, the processing comprises subtracting the representation of the received data signal from the representation of the received further data signal.

Preferably, the subtraction is timed to occur upon a repeat of the data.

Preferably, the data signal comprises a first data signal carrying first data associated with a first RFID tag. The other data signal may comprise a second data signal carrying data associated with a second RFID tag.

In embodiments of the invention, the RFID tags may not be maintained substantially stationary relative to the field generator.

According to a fourth broad aspect of the present invention, there is provided a method for reading data, the method comprising:
generating a field for activating a radio frequency identification ("RFID") tag to transmit a respective data signal carrying data associated with the RFID tag, the field being generated by a field generator;
maintaining one or more RFID tags substantially stationary relative to the field generator for a time period so that the one or more RFID tags are activated by the field to transmit a data signal carrying one or more data associated with the one or more RFID tags;
receiving the data signal;
generating and storing a representation of the received data signal;
placing one or more other RFID tag in the field so that the one or more other RFID tags are activated by the field to transmit an other data signal carrying data associated with the one or more other RFID tags, whilst maintaining the one or more RFID tags substantially stationary relative to the field generator;
receiving a further data signal comprising a combination of the data signal and the other data signal, the combination comprising corrupted data carried by a corrupted data signal arising from a collision involving at least one data signal originating from a conventional RFID tag having no provision for anti-collision;
generating and storing a representation of the received further data signal;
processing the representation of the received data signal and the representation of the received further data signal to determine the other data signal, the determined other data signal including the data signal of the at least one data signal originating from the conventional RFID tag having no provision for anti-collision; and
reading the data of the determined other data signal.

Preferably, the processing comprises subtracting the representation of the received data signal from the representation of the received further data signal.

Preferably, the subtraction is timed to occur upon a repeat of the data.

Preferably, the data signal comprises a first data signal carrying first data associated with a first RFID tag. The other data signal may comprise a second data signal carrying data associated with a second RFID tag.

In embodiments of the invention, the RFID tags may not be maintained substantially stationary relative to the field generator.

According to a fifth broad aspect of the present invention, there is provided a computer-readable storage medium on which is stored instructions that, when executed by a computing means, causes the computing means to perform the method for reading data according to the second or fourth broad aspects of the present invention as hereinbefore described.

According to a sixth broad aspect of the present invention, there is provided a computing means programmed to carry out the method for reading data according to the second or fourth broad aspects of the present invention as hereinbefore described.

According to a seventh broad aspect of the present invention, there is provided an RFID tag for use with a reader according to the first or third broad aspects of the present invention as hereinbefore described.

According to an eighth broad aspect of the present invention, there is provided a system for reading a plurality of data, the system comprising a reader according to the first or third broad aspects of the present invention as hereinbefore described and at least one RFID tag according to the seventh broad aspect of the present invention as hereinbefore described.

BRIEF DESCRIPTION OF THE DRAWINGS

In order that the invention may be more fully understood and put into practice, a preferred embodiment thereof will now be described with reference to the accompanying drawings, in which.

DESCRIPTION OF EMBODIMENTS

Figure 1:
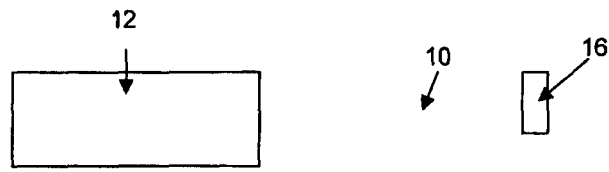
FIG. 1 depicts a conventional arrangement of a prior art RFID system.
Figure 2A:
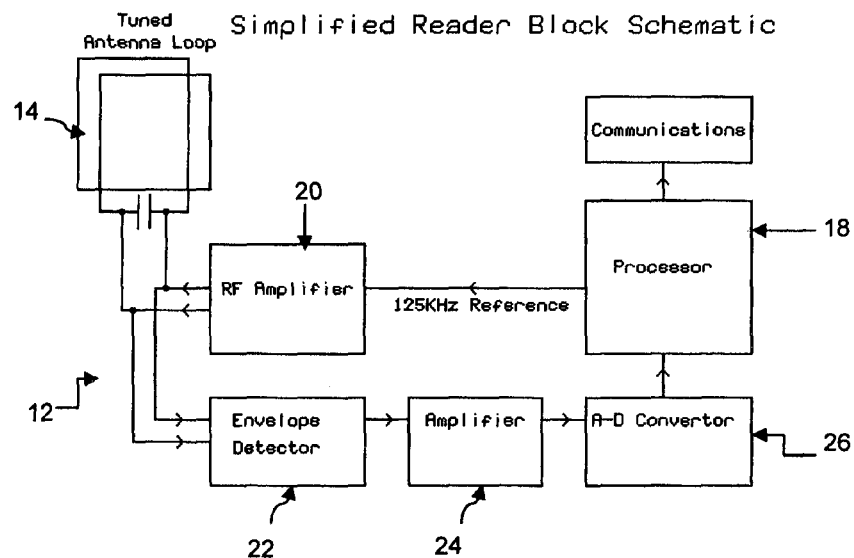
FIG. 2A depicts a block diagram of a reader of the prior art system depicted in FIG. 1.
Figure 2B:
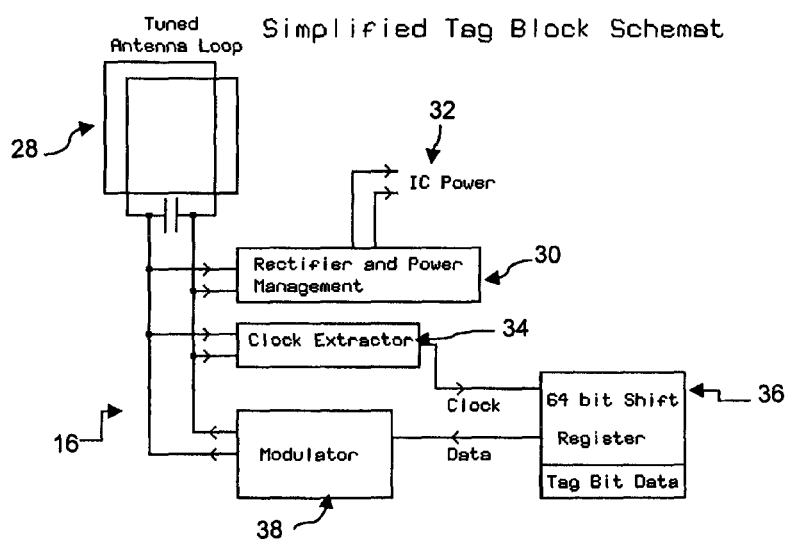
FIG. 2B depicts a block diagram of a tag of the prior art system depicted in FIG. 1.
Figure 3:
FIG. 3 depicts a typical waveform for a Manchester encoded signal.
Figure 4:
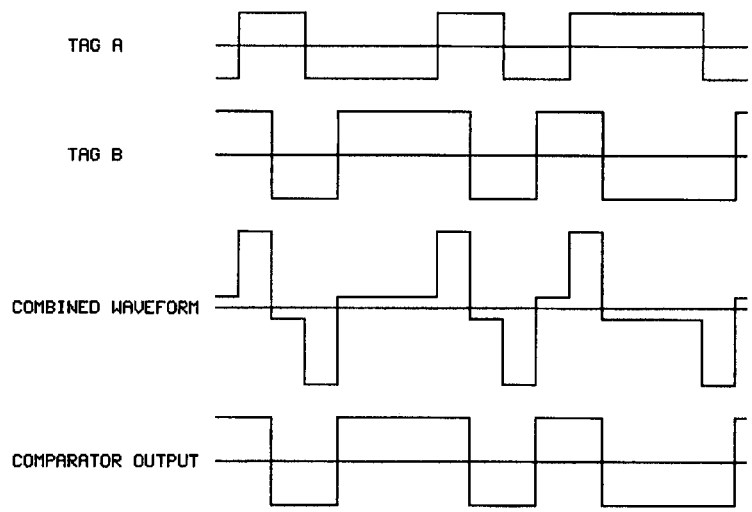
FIG. 4 depicts a waveform arising from a combination of a less dominant signal and a more dominant signal.

Best Mode(s) for Carrying Out the Invention

In the drawings, like features have been referenced with like reference numbers.

Figure 5:
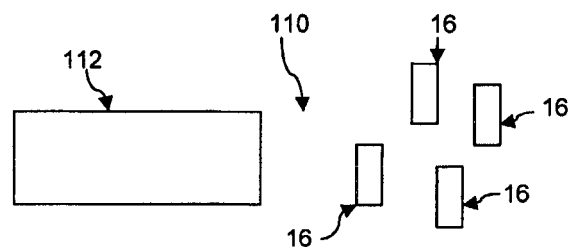
FIG. 5 depicts an embodiment of a system in accordance with an aspect of the present invention.

In FIG. 5, there is depicted an embodiment of a collision RFID system 110 in accordance with an aspect of the present invention.

The system 110 comprises a first module or device in the form of a collision RFID reader 112 and a plurality second modules or devices comprising a source having associated data in the form of RFID tags 16. In the embodiment described, the tags 16 are ordinary or of conventional construction and operation, and function as hereinbefore described under the heading "Background Art". In alternative embodiments of the invention, the sources of data may comprise devices other than conventional RFID tags, as will be described in further detail below.

The data associated with each tag 16 is carried by or encoded in a respective data signal originating from or generated by each tag 16. Particularly, each of the tags 16 contains 64 bits of data in storage means or memory comprising the shift register 36, transmitted as a modulated signal waveform via a communications device in the form of the tag antenna 28 when the tag 16 is located in an RF transmission area or field generated by the reader 112 and energized thereby. When multiple or a plurality of normal tags 16 are present in the field and energised simultaneously, the modulated signal waveforms transmitted by each tag 16 interact and interfere with one another. The respective data signals combine, corrupting the data, and leading to the formation of a complex, corrupted signal or waveform comprising a combination or summation/superposition of the modulated signal waveforms produced by each tag 16. As described previously, traditional readers are unable to function correctly in such a case—they are unable to differentiate the modulated signals of the individual tags 16 from within the corrupted waveform, and are hence unable to differentiate the data of each tag 16 and thereby "read" the data associated with each tag 16. The situation is very complex and, as will be described in further detail below, there are situations where it is impossible to read data from any tags 16 at all if prior art readers are used.

Figure 6:
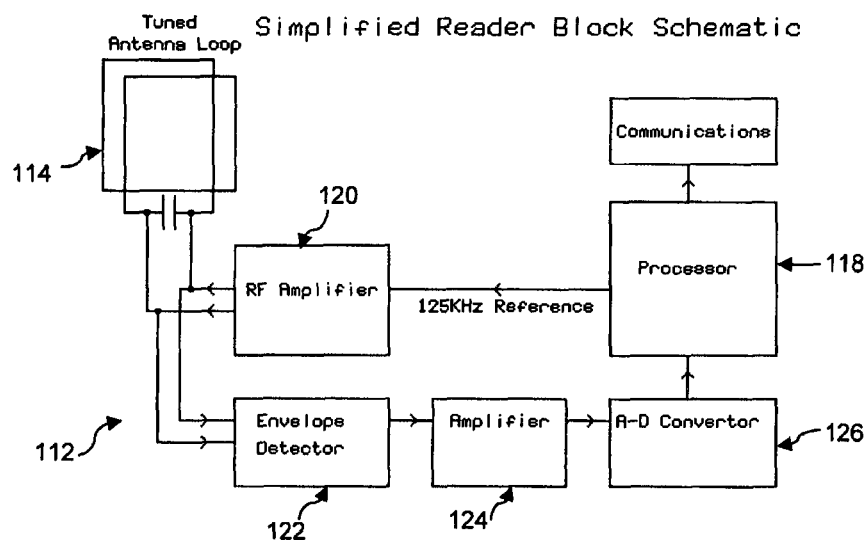
FIG. 6 depicts a block diagram of a reader of system of FIG. 5.

A block diagram for the reader 112 of the embodiment of the invention is depicted in FIG. 6 of the drawings.

The reader 112 comprises a communications device in the form of a tuned loop reader antenna 114 operable to generate and transmit a signal to establish the RF transmission area or field and to receive a response signal from a tag 16. It thus functions as a transceiver and field generator.

The reader 112 comprises a controller having processing means operable for processing/executing instructions and managing the flow of data and information through the reader 112. For example, the processing means can be any custom made or commercially available processor, a central processing unit (CPU), a data signal processor (DSP) or an auxiliary processor among several processors associated with the reader 112. The processing means may be a semiconductor based microprocessor (in the form of a microchip) or a macroprocessor, for example. In the embodiment described, the processing means comprises a reader microprocessor 118 operably coupled to a storage means, device or medium in the form of reader memory. In embodiments of the invention, the storage means, device or medium can include any one or combination of volatile memory elements (e.g., random access memory (RAM) such as dynamic random access memory (DRAM), static random access memory (SRAM)) and non-volatile memory elements (e.g., read only memory (ROM), erasable programmable read only memory (EPROM), electronically erasable programmable read only memory (EEPROM), programmable read only memory (PROM), tape, compact disc read only memory (CD-ROM), etc.). The storage medium may incorporate electronic, magnetic, optical and/or other types of storage media. Furthermore, the storage medium can have a distributed architecture, where various components are situated remote from one another, but can be accessed by the processing means. For example, the ROM may store various instructions, programs, software, or applications to be executed by the processing means to control the operation of the reader and the RAM may temporarily store variables or results of the operations. Where the word "store" is used in the context of the present invention, it is to be understood as including reference to the retaining or holding of data or information both permanently and/or temporarily in the storage means, device or medium for later retrieval, and momentarily or instantaneously, for example as part of a processing operation being performed by the system 110.

The microprocessor 118 is operable, under control of executable instructions or software stored on the memory, to enable the reader 112 to perform operations or actions, as will be described in further detail below. Particularly, the microprocessor 118 is operable, under control of the instructions, to receive and store in the reader memory a representation of the combination of the respective data signals, process the representation to determine a first data signal of the combination of the respective data signals of the representation, and to read the data of the determined first data signal. As will be described in further detail, the processing that is performed varies according to analysis of the combination of the modulated signal waveforms produced by each tag 16. The analysis includes Voltage Level Analysis, Comparison Analysis, and Modulation Asymmetry Analysis. Software modules are stored on the memory that, when executed, provide instructions to the microprocessor 118 to perform the processing and analysis as described. Additionally, a software module is stored on the memory that, when executed, provide instructions to the microprocessor 118 to perform a Reduction Cycle process as will be described in further detail below.

Software in the set of modules, or any set of instructions or programs for the system 110, can be written in any suitable language, as are well known to persons skilled in the art. The software can be provided as stand-alone applications, via a network, or added as middle-ware, depending on the system requirements.

In alternative embodiments of the invention, the modules may be implemented in hardware. In such a case, for example, the modules may be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA) and the like.

The microprocessor 118 is further operable to provide a stable 125 KHz reference frequency from an onboard PWM output. This is amplified by an un-modulated RF reader amplifier 120 and used to power the reader antenna 114 at a frequency of 125 KHz.

Current in the loop of the reader antenna 114 generates an inductive AC field around the loop. Also connected to the loop of the reader antenna 14 is detection means in the form of an envelope detector 122. In the embodiment described, the envelope detector 122 comprises a diode detector. The diode detector is operable to detect signal modulation of a signal received via the reader antenna 14 to recover the signal waveform envelope. The components of the reader 112 are operably connected such that any signal modulation that appears on the tuned loop of the reader antenna 114 will be detected and amplified.

Output from the envelop detector 22 is presented to a detector amplifier 124 such that detected waveforms or signals are amplified and not limited. In the embodiment described, it is important that the signals are always within the dynamic range of the detector amplifier 124 to ensure that no waveform information is lost. To receive and store in the memory of the reader 112 the representation of the combination of the respective data signals of a detected waveform, the output of the detector amplifier 124 is presented to an ADC 126 operable to sample the analogue signal outputted from the detector amplifier 124 into digitised samples each having a digital value. The samples (digital values) are stored in ram memory of the reader 112 in digital form. Therefore, in the embodiment described, the representation comprises the samples.

A power supply (not shown) provides power to the components of the reader 112, which are all operably connected or coupled via appropriate circuitry to enable the reader 112 to perform functions as described, and are housed in a suitable housing or casing (not shown).

Voltage Level Analysis

Figure 8:
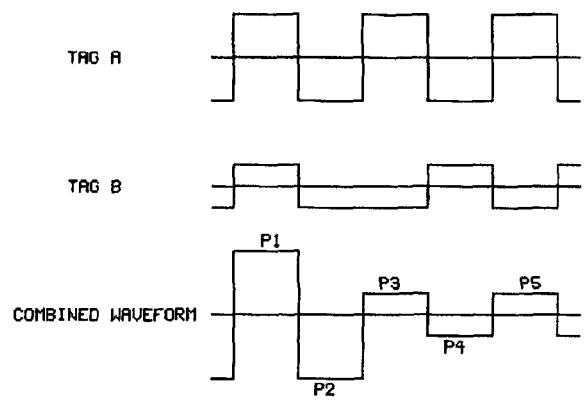
FIG. 8 depicts an idealized result when two unequal waveforms are added.

The overall magnitude of the signal modulation from or associated with, say two tags 16 having waveforms or signals A and B, respectively, at any point, is the sum of the modulations originating from each individual tag 16. Thus we can only have A+B or A−B for the resultant waveform of their combination. FIG. 8 of the drawings depicts an idealised result when two unequal waveforms are added. In the combined waveform signal it can be seen that there are four discrete voltage levels or plateaus. If we examine point P1, this is a maximum voltage level, so at this point the waveforms for A and B must both be positive at that point. Now taking P2, it is a minimum voltage level so the waveforms for A and B must both be negative at that point. Taking the point P3, it can be seen that this must be the result of the tag 16 providing the most modulation on a positive excursion minus the negative excursion of the tag 16 providing less modulation. Taking point P4 we can see that this can only be due to the tag 16 providing the most modulation on a negative excursion plus the voltage of the tag 16 providing minimum modulation. In short, by examining the voltage levels or plateaus it is possible to determine the sign of both tags 16 associated with waveforms A and B at every point. In the embodiment described, the microprocessor 118 of the reader 112, under control of the instructions, is operable to do this by comparing successive AD readings of the ADC 126 producing the representation and allocating the voltage levels to a data signal associated with a respective one of the tags 16. The resolution for 3 tags 16 follows the same principles except there are 8 possible levels of amplitude to consider, and so on.

As previously described, in the real world the received data will be not be perfectly shaped, as in the idealised waveforms depicted for explanation purposes in the drawings. Real waveforms will have finite rise and fall times dependent on factors including the Q of the loop of the reader antenna 114, the detection method, and the amplifier response curves. If the rise and fall times are small then the voltage levels alone can be used in the analysis as described.

Alternatively, in embodiments of the invention, the voltage levels can also be determined or established by calculating first and second derivatives of the representation. In such a case, the microprocessor 118 of the reader 112, under control of the instructions, is operable to calculate the first and second derivatives of the representation of the detected waveform at all points as both will be zero or close to zero at a steady voltage level. The voltage levels at these points will correspond to given possible levels of active tags 16 in the field.

Once a tag 16 or tags 16 have been read and no further tags can be read using this method, other analysis methods such as those herein described can be used either interwoven or in combination with this method or separately to read more tags 16.

Comparison Anaylysis

Each part of every tag waveform may be looked upon or considered as information and so it is advantageous to receive the signal data as faithfully as possible. Consider the analog of a listener trying to hear as many people talking at the same time as possible. A first condition is that the people must be as near as possible to the listener without overloading the listeners ears. Overloading causes loss of information by distortion and saturation. A second condition is that everybody must be talking at the same volume. It is no good to have one person up closer than any other or the rest will not be heard by the listener. If there is some level of white noise in the background it becomes even more essential that everybody is at the same distance. The electrical system 110 of the embodiment of the invention has similar conditions and constraints. In order to simultaneously read as many tags 16 as possible, the tags 16 should preferably be as near the reader 112 as possible, but under a threshold of distortion or saturation. It is desirable for the tags 16 to all be equi-distant to the reader 112 and making equal signal contributions. If a dominant tag 16 is present it may reduce the number of other tags 16 that can be identified and read.

Figure 9:
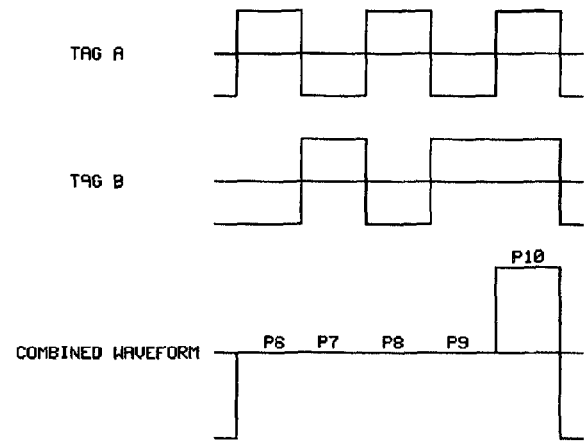
FIG. 9 depicts a waveform showing a result of a combination of modulations.
Figure 10:
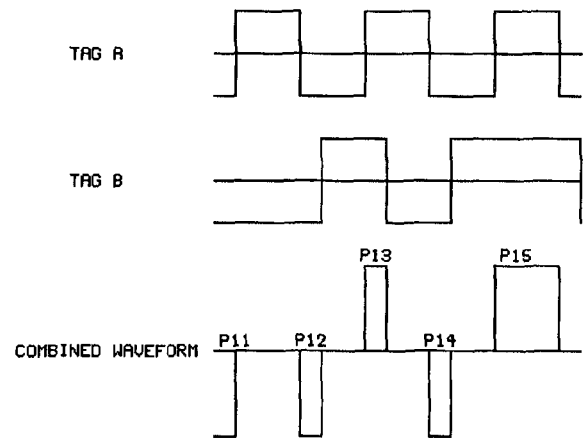
FIG. 10 depicts the result of the combination of modulations of FIG. 9 where there is a small phase difference between waveforms.

The reader 112 described works best when all the tags 16 are equi-distant, and in embodiments will be used in this context, for example on production lines and similar operations. Consequently it should be expected, in such embodiments, that it will be normal for there to be two tags 16 associated with waveforms of substantially equal modulation in the field. This can cause a problem because there will be places where the result of the modulations from the waveforms A and B of the tags 16 will be close to zero. At these points, as depicted at P6, P7, P8, and P9 in FIG. 9, the modulations of the tags 16 will be opposite but the reader 112 will not able to determine which modulation is due to which tag 16 by the analysis methods hereinbefore described. The exception to this may be Modulation Asymmetry Analysis described later, but, because it examines only small effects it may not be applicable in all situations. However, the above description has only considered waveforms A and B of originating from respective tags 16 when they are in phase. In the real world, waveforms generated by the tags 16 can have any of 32 phase positions in the space of 1 raw data bit relative to each other since the tags 16 are using the RF frequency divided by 32 to get the bit rate of the data transmission. The actual phase positions adopted depend on factors including chance or randomness and how the corresponding or associated tag 16 was introduced into the RF field. The case where waveforms A and B are in phase is depicted in FIG. 9. FIG. 10 of the drawings depicts the same data but with a small phase difference between waveforms A and B of the two tags 16. Now, where there was previously zero net field modulation, in the situation depicted in FIG. 10 there are narrow spikes of modulation at moments P12, P13, and P14. Looking at the transitions in the time domain of a single bit it is apparent that the waveform of one tag 16 will be leading and the waveform of the other tag lagging. For example, assume that waveform A of the first tag 16 is leading. The shape at moment P12 can only be caused by the leading waveform A of the first tag 16 transiting negative at this point closely followed by the lagging waveform B of the second tag 16 transiting positive. The shape at moment P13 can only be caused by the leading waveform A of the first tag 16 transiting positive at this point followed by the lagging waveform B of the second tag 16 transiting negative. The shape at moment P14 can only be caused by the leading waveform A of the first tag 16 transiting negative at this point closely followed by the lagging waveform B of the second tag 16 transiting positive. The waveform at moment P15 can only be the leading waveform A of the first tag 16 transiting positive. So at every stage the original waveform of both tags 16 can be determined. There can be more than two tags 16 in the field and providing the transition times are separated, that is the phases are not the same or identical, this method of analysis can be used to determine them all. Accordingly, the microprocessor 118 is operable, under control of the instructions, to conduct a comparison or review of the representation and to allocate a data signal associated with a respective one of the tags 16 on the basis of the comparison.

In the real world, the waveforms have finite rise times and fall times. Preferably, the comparison or review comprises a direct comparison of a magnitude of analogue to digital samples or readings and/or of slopes of curves/rates of change (dv/dt) associated with the representation to determine the transitions of a bit of received tag data (directions of multiple transitions in the time domain. A positive slope will correspond to the start of the data going positive and a negative slope to the start of data going negative.

When this method of detection is used by the reader 112 and the data signal associated with a tag 16 or tags 16 has been read, and no further tags can be read using this method, other analysis methods such as those herein described, can be used either in conjunction or in combination with this method or interwoven with it or separately to read more tags 16.

Modulation Asymmetry Analysis

As hereinbefore described, FIG. 9 depicts how it is possible for parts of the data signal to cancel out (i.e. places where the result of the modulations from the waveforms A and B of the tags 16 are zero) when the modulation on/off periods are the same and the tags 16 are equally distant from the reader 112. 100% signal cancellation occurs when the two tags 16 are in phase at the same distance from the reader 112 and cancel for several bit positions labelled P6, P7, P8, and P9 in FIG. 9. The cancellation occurs because the tag modulation has up and down modulation characteristics and the 'on' period is as long as the 'off' period. That is, it is basically Manchester encoding, which is often used because it enables receivers to use simple AC coupled amplifiers by eliminating the DC element. In such a situation, the signals associated with the tags 16 contribute equal and opposite modulations and it is theoretically impossible to detect anything at the times of signal cancellation.

In reality, asymmetry in the generated waveforms caused by characteristics or features such as, for example, differing on and off times and or differing on and off switching characteristics and other non-linearities, or other imperfections in the modulation process, result in the cancellation being incomplete, especially at medium/long range so that even if there is cancellation, the cancellation leaves signal remnants which may comprise indicators such as little 'pips', which may still reveal the switching directions of the waveforms associated with some tags 16. The system 110 is operable to use the remnants to analyse and read the tags 16 as will be described in further detail below. The task is difficult, however, because the effect is small and is easily masked by the signal contributions of other tags 16 that may be present and noise.

Figure 11:
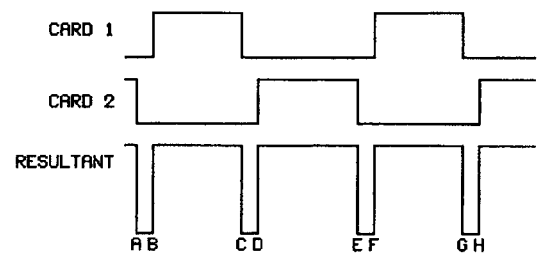
FIG. 11 depicts an exaggerated waveform showing incomplete waveform cancelation.

FIG. 11 depicts waveforms associated with two tags 16, Card 1 and Card 2, with an exaggerated depiction of asymmetric modulations that are partially cancelling. In this embodiment, the tag or card modulation used comprises Manchester encoding but with slightly different or varying on/off periods. It can be seen that there is major cancellation, yet the original waveforms can still be determined by processing as follows. The timing of points A and E are one Manchester period apart and can thus be associated with a signal arising from a single modulation source (Card 2). Further, the length of the on/off times are prescribed or predetermined so points D and H may be readily associated with the same card or tag 16. Thus, it can be determined that Card 2 goes negative at point A, goes positive at point D, goes negative at point E and goes positive at point H. Likewise the timing of points B, C, F, and G can be associated with a single modulation source (Card 1) and it can be seen determined that Card 1 goes positive at point B, goes negative at point C, goes positive at point F and goes negative at point G.

Figure 12:
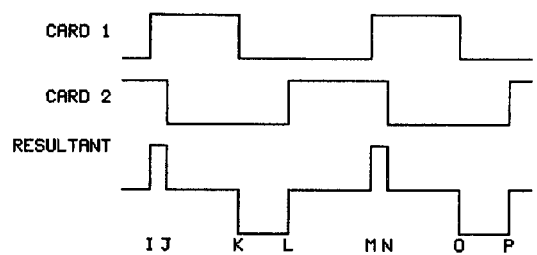
FIG. 12 depicts an exaggerated waveform showing incomplete waveform cancelation.

FIG. 12 depicts another example of an exaggerated case of asymmetric modulation of waveforms associated with two tags 16, Card 1 and Card 2. Here it can be seen that the cancellation takes a different shape but the original waveforms can once again be determined by processing as follows. The timing of points I and M are one data period apart. As the length of the on/off times are prescribed or predetermined, points K and 0 will be associated with the same modulation source (Card1) Thus, it can be determined that Card 1 goes positive at point I, goes negative at point K, goes positive at point M and goes negative at point O. Likewise points J, L, N, and P can be associated with a single modulation source (Card 2). Thus it can be determined that Card 2 goes negative at point J, goes positive at point L, goes negative at point N and goes positive at point P.

Figure 13:
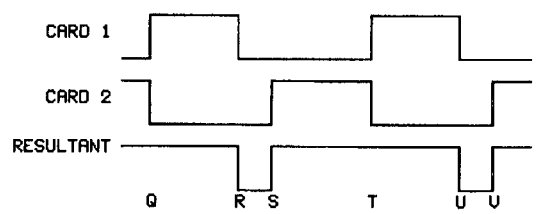
FIG. 13 depicts an exaggerated waveform showing incomplete waveform cancelation.

FIG. 13 depicts another example of an exaggerated case of asymmetric modulation of waveforms associated with two tags 16, Card 1 and Card 2. Here there has been cancellation at some of the switching points. It is no longer possible to see any substantial transitions at positions or points Q or T because they have been lost in cancellation. However we can still determine the original waveforms by processing as follows. Considering point T, we can see that we have an earlier positive transition at point S and the timing is such that a negative transition is due at point T, likewise we have a negative transition at point R and are due for a positive transition, again at point T. Thus it can be determined from earlier transitions—not shown, that the waveform of the signal associated with Card 1 has gone positive at point Q, negative at point T, positive at point T and negative at point U, while the waveform of the signal associated with Card 2 has gone negative at point Q, positive at point S, negative at point T and positive at point V.

As with the previously described methods, if a tag or tags 16 have been read by the reader 112 and no further tags 16 can be read using this method, other analysis methods such as those herein described, can be used either in conjunction or in combination with this method or interwoven with it or separately to read more tags 16.

In embodiments of the invention, instead of using unintentional modulation flaws in the signals associated with the tags 16 (that is, asymmetry in the generated waveforms arising naturally as hereinbefore described), the system deliberately introduces asymmetry into the signals generated. In one embodiment, the sources are operable so that data signals originating therefrom have unequal modulation of on/off periods to facilitate anti-collision detection and make it correspondingly easier.

Reduction Cycles

In the embodiment described, the reduction cycle process performed by the system does not in itself analyse data or identify a tag ID. It works cooperatively or hand in hand with software analysis modules of the system 110, such as those hereinbefore described, to read as many tags 16 as possible. It may be used at any stage after a tag 16 has been read but is usually used when the tag analysis modules have read a tag or tags and can progress no further.

Consider the situation where there are multiple tags 16 and at least one tag 16 has been analysed and identified and all attempts to identify a subsequent tag fail. This can easily happen because the best conditions for reading multiple tags 16 occur when all of the tags 16 are substantially equally distant from the reader 112, however this is also the optimum condition for signal cancellation. Signal cancellation can occur if the phase shift between two tags 16 is at or near zero and one tag 16 is sending a "01" signal waveform and another is sending a "10" signal waveform. In this condition the tags 16 will be contributing substantially equal and opposite modulation so that signal cancellation occurs and this part of the data string is lost or difficult to analyse.

The system 110 of the embodiment under consideration has a clock extractor having modulus 32. The starting phase of the signal originating from each tag can be randomly any one of 32 positions. Accordingly, the chance of likelihood of signal cancellation occurring the system 110 are therefore 1 in 32.

As will be described in further detail below, in embodiments of the invention these phases can actually be changed by stopping and starting the RF in a sweeping process, in which case in the next sweep these particular tags 16 signals will be unlikely to be cancelled, however, to optimise performance it is advantageous to use every chance or opportunity to read as many tags 16 as possible on the current sweep.

So, suppose we have a pair, or multiple pairs of tags 16 that have some degree of signal cancellation. As hereinbefore described, even in extreme cases where the waveforms originating from two tags 16 are in phase and are contributing equal and opposite signals leading to cancellation, the cancellation is not always complete leaving a remnant (or little "pips") that may be analysed using asymmetric analysis. The task is difficult because the effect is small and is easily masked by the signal contributions of the other tags 16 and noise. Still, it may be possible to read one of these tags 16 but not the other. Indeed, it is often the case that signals originating from several pairs of tags 16 with distributed phases are cancelling and the ID of one or more tags 16 has been determined by asymmetric analysis (of the pips) but the reader 112 can progress no further.

Via execution of the reduction cycle process, the system 110 is operable to remove the contribution(s) made by the signal(s) of or associated with the tags 16 that have been read from a representation of a combination of respective data signals received and stored in the memory (signal memory). In this manner it is able to advantageously remove much of the signal masking that has occurred. If there are signals associated with pairs of tags 16 that are cancelling and the ID of one of each pair of tags 16 has been determined, via the reduction cycle process the system 110 is operable to subtract their contribution to the stored signal memory, revealing the remaining paired tags 16 signals without any cancellation at all, at least at or near the switching sections, allowing the reader 112 to attempt to read more tags 16 using all the forms of analysis available in the embodiment of the system 110.

Once the ID of a successfully read tag or tags 16 has been determined, via the reduction cycle process the system 110 is operable to select or choose one of them and construct a digitally simulated waveform exactly equal to the signal(s) contributed by the chosen or selected tag and subtract it from the raw signal data.

To this end the reader 112 is operable to receive and store typical waveforms in the memory that can be recalled or retrieved. Preferably, the stored waveforms are accurate because the process may be repeated several times and the accuracy of the reference waveforms should be such that several sequential subtractions will not inject significant errors into the stored signal data. There are additionally analogue to digital quantising errors, amplifier white noise and shot noise and external interference to contend with. This is a reason why the reader 112 of the embodiment performs best when all of the tags 16 are at substantially equal distances from the reader 112, since any low signal contributing tag 16 will get lost in the system noise. At every stage in the process, linearity and accuracy are highly desirable.

Real world waveforms are not simple square waves; the leading and lagging edges of the waveforms have finite times caused by multiple attenuations of high frequencies throughout the system 110 and sagging during sustained periods due to capacitive coupling.

Figure 7:
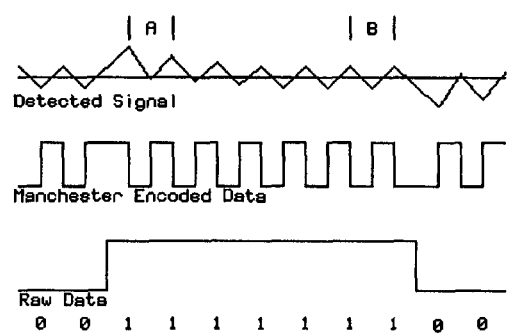
FIG. 7 depicts the effects of reduced bandwidth (limited frequency response) and capacitive coupling in a detector amplifier of the reader of FIG. 6.

The waveforms that are actually detected by the reader 112 will be altered or changed by factors including the Q (ratio of impedance to resistance) of the loop of the reader antenna 114, the envelope detector 122, and the detector amplifier 124. FIG. 7 of the drawings depicts the effects of reduced bandwidth (limited frequency response) and capacitive coupling in the detector amplifier 124. It should be noted that the waveforms have been deliberately exaggerated to show the effects clearly.

As described previously, the raw tag data is first converted to Manchester code and the tags 16 are operable to use this to modulate the field. The tag modulation at the tag antenna 28 of the tags 16 is still of good shape because the coupling to the reader antenna 114 is low and not affected by it. However, the Q of the reader antenna 114 needs to be high, in the embodiment described, to reduce interference and to get a large circulating current using modest input RF power. Sidebands can be seriously attenuated. Consequently, after detection by the envelope detector 122, the waveform has a more triangular shape. In this regard, FIG. 7 depicts a grossly exaggerated waveform for demonstration purposes only. It can be seen that after the bit changes from a '0' to a '1' the waveform will keep rising and after a bit change from a '1' to a '0' the waveform keeps falling. Although the bits at times 'A' and 'B' of the detected signal waveform are both encoded bit the shape at time 'A' is quite different in shape to the '1' bit at time B. It can be seen that the illustrated waveform has recovered its DC level after another 6 bits. In fact, the effect of any single bit after another 6 bits is very small, so in the embodiment described, the reader 112 only needs to be operable to store in memory a representation of the waveforms of a '0' after all the combinations of 6 bits and store a representation of the waveforms of a '1' after all combinations of 6 bits to be able to reconstruct an accurate waveform. This amounts to a total of 128 waveform patterns.

The microprocessor 118 of the reader 112 is operable, under control of the instructions, to build up or construct a simulated data signal or waveform bit by bit, matching the previous 5 bits to the new one and so on until the complete waveform of all 64 bits of the tag or tags that have been read have been created in digital form in memory.

Once the simulation of the first data signal or waveform has been constructed, the reader 112, via action of the microprocessor 118 under control of the instructions, is operable to digitally subtract the simulated waveform from the representation (i.e. the digitised received complex/combination signal waveform on the fly), at the time each bit of data is received. Alternatively, the reader 112 may be operable to digitise and store the representation of the complex received signal in the memory and to subtract the constructed waveform from the representation of the received signal data in the memory.

If it is the case that multiple tags 16 have been read without the need for subtraction, the system 110 is operable to choose or select a single one of these and to use the associated or corresponding data (of the selected one) to use as a basis to perform the construction of a simulated waveform and subtraction from the representation of the received signal data in the memory.

This process will result in a modified representation with the contribution of the data originating from the chosen tag 16 removed. An attempt at reading a further tag 16 or tags 16 using any of the analysis methods described can be made and the process repeated until the contributions of all the tags 16 that have been read have been subtracted from the representation of the received signal data in the memory and no more tags 16 can be identified.

In embodiments of the invention, the above described process for subtraction may be enhanced by the microprocessor 118 of the reader 112 performing another level of processing under control of the instructions. It is desirable for the magnitude of the constructed simulated waveform to, as close as possible, match the actual magnitude of the received data. The reader 112 may be operable to conduct one or more trial sweeps on the received data with various scaling factors. In such an embodiment, the reader 112 is operable, after each sweep, to check the remaining data for another tag or tags 16 and if a tag 16 is found to concentrate on the values of scaling more so as to get a reading of the data originating from the further tag 16 in a centre of a range of scaling factors and to use this for the final subtraction. The whole process is repeated until data originating from all of the tags 16 are pulled out—i.e. isolated and read.

According to the embodiment described, in the above process, several tags 16 may be read and yet only one is chosen for the subtraction process. When reading fails, another of the tags 16 that have been read but not used for subtraction is chosen and its simulated waveform subtracted from the representation of the received signal data in the memory until all of the tags 16 that have been read have been processed.

In alternative embodiments of the invention, if several tags have been read a composite waveform could be constructed and subtracted. It should be remembered, however, that the reference waveforms are not perfect and the subtraction process itself may contribute errors. Consequently it is advantageous and preferably to subtract the contribution of one tag 16 at a time and see if more tags 16 can be read and the process repeated.

It is to be appreciated that the analysis methods can be used to identify and read, that is 'pull out' multiple tags 16. The reader 112 of the embodiment is not limited to reading a single tag 16 before performing the subtraction process. It is preferable and advantageous if the subtraction process of the reduction cycle is not carried out until the reader 112 can detect no more tags 16 using all other methods, and then one of the tags 16 that has been read is chosen with no particular preference to create a simulated waveform for subtraction and a new try at reading tags is carried out. If no new tag 16 is identified out then another of the tags 16 that has been read is subtracted and so on.

The reader 112 is operable to use any of the above described methods of analysis in any combination or sequence as required or desirable—using the reading of a tag 16 and constructing the corresponding digital waveform and finding a subsequent tag or tags 16 and or using the combination of the voltage levels and also using direction information as above for the brief excursions as described in relation to FIG. 10. The reader 112 is operable to use the methods serially or interwoven or in parallel at every stage. This will generally be sufficient to read data associated with all tags 16 present in the field.

In situations where waveforms associated with tags 16 are of equal modulation and also in phase there will be major cancellation and little or no lead/lag excursions or dv/dt slopes to analyse to obtain directions.

As previously described, a traditional card reader emits a constant RF field. The relative phases of the waveforms generated by tags 16 in the field depend on factors including a time and a speed at which the tag was placed in the field. The voltage on the coil of the tuned circuit of the tag 16 increases or builds up until it reaches a working voltage sufficient to energise the other components of the tag 16 to start to modulate the field as described previously. Sometimes, when two or more tags 16 are placed in the field, the amplitudes and phases of the waveforms associated with each will both be the same. It would be inconvenient, and in some situations impractical, for a user to withdraw the tags 16 from the field and to reinsert them with the hope that such action will result in the associated waveforms generated having different amplitudes and phases. One solution to this problem would be for the reader 112 to be operable, when it cannot analyse a situation, to cease generating the field for a moment and then restarting it, or it could be operable to just keep stopping and starting the field regardless. This has the same effect as a user physically withdrawing the tags 16 and replacing them in the field.

On the face of it this procedure will not work because the waveforms generated by the tags 16 will simply settle down exactly as they were previously. It is after all a maxim that all similar actions will have similar results and if the RF field is turned off and on in a regular manner, the tags 16 should start working exactly as before and nothing will be achieved. Similarly, traditional thinking says that if the on-time or the off-time is changed then the waveforms generated by the tags 16 will still settle down as before and nothing gained.

When the field is removed, the oscillation in the circuits and components of the tag 16 decays, until it falls below the tag working voltage and the tag microchip 32 stops working, and the voltage in the tuned circuit continues to decay until it approaches zero. If the field is reapplied after this point, the tags 16 will indeed tend to settle down as before.

However, the inventor has determined that if the RF field is reapplied before the oscillation in the circuits of the tags 16 have decayed to zero then the result is different.

Particularly, after the power has been turned off the oscillation in the circuits of the tags 16 begins to decay. It may take several milliseconds for the oscillation to decay to a negligible value before the next pulse is applied. During this time there may have been 1000 cycles or more. Now, during the pulse the oscillation frequency is forced to precisely 125 KHz, the frequency of the RF field, however when the field is removed the tag 16 resonates at the precise resonant point of the tag 16. Due to natural manufacturing variations the precise resonant point for each particular tag 16 will all be very slightly different to 125 KHz, so the moment the RF field is reapplied the phasing of the tags residual oscillation after 1000 or more cycles will all vary considerably. A tiny change in the resonant frequency after 1000 cycles will result in a huge change between the phases of the residual oscillation in the tags 16. The waveforms associated with some tags 16 will be in phase with the newly applied RF field and the exponential rise of the tags voltage will get a boost, but in other tags 16 the residual oscillation in the tags 16 will cancel the RF field and delay the start of the rise in the oscillation. There will also be infinite variations in-between these two extremes so it is unlikely that the waveform generated by any two tags 16 will be the same following such action. When the voltage on the coil of the tuned circuit of the tag 16 is sufficient the tag microchip 32 will start to work, resulting in the tags 16 assuming a distribution among the 32 possible phases according to the various rises in oscillation.

Now if the field is switched on and off at precisely the same times it is still likely that the tags 16 will start up in the same order, the maxim still holds that all similar actions will have similar results.

However, the inventor has determined that a change in the timing of the off period, even a small one, will cause a large change in the way the tags 16 will settle down. In fact, the inventor has determined that it requires only a very small change in the off period timing to get a large change in the phase distribution of the waveforms generated by the tags 16, provided the tags 16 still have some residual oscillation when the field is reapplied. Other small changes can be equally effective but harder to arrange. For example, in embodiments of the invention the RF power of the field generated by the reader 112 can be varied, in which case the tags 16 will take different times to reach the working voltage resulting in a change in the phasing distribution of the associated waveforms.

The reader 112 is operable to change or vary the on/off period of the field a small amount to cause the waveforms associated with each tag to rearrange sufficiently different.

In embodiments of the invention, instead of, or in addition to, being operable to change the generated RF field off time or the RF amplitude, the reader 112 is operable to introduce an amount, preferably small, of RF noise during the off period. The inventor has determined that this too will cause sufficient changes to the phase and magnitude of the oscillation in the tuned circuits of the tags 16, causing the tags 16, and the waveforms generated thereby, to rearrange differently when the RF power is reapplied, for the same reasons as described above.

In embodiments of the system 110, the maximum number of tags 16 will only be limited by the by the time it is possible to wait for the tags 16 to sort themselves out so that the data associated with one or more can be read until all of the tags 16 are eventually read.

In the described embodiment of the invention the natural manufacturing variations present in normal tags 16 are used to achieve a random distribution in phasing of associated waveforms upon re-applying the RF field. However, in embodiments of the invention, variations in tag parameters can be deliberately introduced to achieve helpful phase distributions upon re-application of the RF field. The variations can include working voltage, resonance, and starting the divider in the data extractor at random numbers from 1 to 32, for example.

In another embodiment of the invention, the reader 112 is operable to undertake another method of analysis, as follows, either additional to, as an alternative to, or in combination with, any of the methods described above. This method is applicable in a scenario where a first tag 16 is in reading distance, i.e. energised by the field generated by the reader 112, and held roughly or substantially stationary or motionless relative to the reader 112 for a period of time (which may be prescribed such as the time required for the reader 112 to receive a train of 64 bits of data carried by the data signal generated by the first tag 16—namely 32 mS).

The microprocessor 118 of the reader 112, under control of the instructions, is operable to receive and store a digitised representation (initial or first representation) of the detected data signal in the memory, as hereinbefore described.

The subsequent introduction of a second tag 16 into the field of the reader 112, whilst the first (i.e. original) tag 16 is again held substantially stationary or not moved substantially for the period of time relative to the reader 12, will result in a combined signal (comprising a combination of the data signal associated with the first tag 16 and the data signal associated with the second tag 16) being generated as the second tag 16 is energised. The microprocessor 118 of the reader 112, under control of the instructions, is operable to detect the combined signal and to store a digitised representation (subsequent or second representation) of it for the time period (32 mS in the embodiment described) in the memory.

The microprocessor 118, under control of the instructions, is then operable to subtract the first representation from the second representation. This will result in an output comprising the contribution of the data signal associated with the second tag 16—allowing the data carried thereby to be isolated and (the second tag 16) identified and read by the reader 112. This method is advantageous in that it does not require the phasing and/or amplitudes of the data signals generated by the tags 16 to be different to enable them to be isolated and read (thus mitigating the need for the field to be turned off (i.e. cancelled) or on (re-established) to change the distribution), and also facilitates the identification of weakly contributing tag signals. It works well in a dynamic situation, which can be the case in many card reading situations in the real world.

In an embodiment of the invention, the system 110 comprises a software module operable to perform a dominant tag analysis. This analysis is advantageous in a situation in which several tags 16 are in the transmission field, each transmitting a respective associated modulated signal waveform, but there is a first or dominant tag 16 having an associated modulated signal waveform responsible for most of the received corrupted waveform of the combination of the respective data signals. In such a case, the data of the dominant tag 16 may still be read using a traditional detection method (as hereinbefore described) but leaving the data of the other tags 16 unread. In this scenario, the data signal originating from the dominant tag 16 obscures the contribution to the signal combination of the data signals originating from the less dominant tags 16. This scenario may arise as a result of, for example, the less dominant tags 16 being more distant from the reader 112 than the dominant tag 16. For example, the signal transmitted by the dominant tag 16 may have 10 times more modulation than the signal generated by the next closest tag 16 to the reader 112. The reader 112 is operable to remove to contribution made by the signal associated with the dominant tag 16 from the complex waveform, enabling the contributions made by the signals associated with the other tags 16 to be successively read.

If the signal associated with a less dominant tag 16 has an overall contribution of 5% of the complex waveform but the reader 112 can only estimate the effect of the signal associated with the dominant tag 16 to an accuracy of 10%, then it will not be able to determine the data signal originating from the second tag, so the reader 112, in such an embodiment, must be operable to exactly remove the effect of the signal associated with the dominant tag 16 to a high accuracy.

The microprocessor 118 of the reader 112 is operable, under control of the instructions of the dominant tag analysis software module, to read the data of the signal of the dominant tag 16 (as it is the dominant or primary signal component of the combination of data signals) to build up or construct a simulated first or dominant data signal or waveform bit by bit, matching the previous 5 bits to the new one and so on until the complete waveform of all 64 bits of the dominant tag data has been created in digital form in memory.

Once the simulation of the first data signal or waveform has been constructed, the reader 112, via action of the microprocessor 118 under control of the instructions, is operable to digitally subtract the simulated waveform from the representation (i.e. the digitised received complex/combination signal waveform on the fly), at the time each bit of data is received. Alternatively, the reader 112 may be operable to digitise and store the representation of the complex received signal in the memory and to subtract the constructed waveform from the representation of the received signal data in the memory.

This process will result in a modified representation comprising only the digitised signals of the remaining tags 16 including a second or next dominant tag 16, which can then be detected and the process can be repeated and repeated until the data originating from all of the tags 16 are read. In this manner, the data signals originating from each of the respective tags 16, and the associated data, may be isolated or identified and read.

In an embodiment of the invention, the system 110 comprises a software module operable to perform a dominant tag analysis. This analysis is advantageous in a situation in which several tags 16 are in the transmission field, each transmitting a respective associated modulated signal waveform, but there is a first or dominant tag 16 having an associated modulated signal waveform responsible for most of the received corrupted waveform of the combination of the respective data signals. In such a case, the data of the dominant tag 16 may still be read using a traditional detection method (as hereinbefore described) but leaving the data of the other tags 16 unread. In this scenario, the data signal originating from the dominant tag 16 obscures the contribution to the signal combination of the data signals originating from the less dominant tags 16. This scenario may arise as a result of, for example, the less dominant tags 16 being more distant from the reader 112 than the dominant tag 16. For example, the signal transmitted by the dominant tag 16 may have 10 times more modulation than the signal generated by the next closest tag 16 to the reader 112. The reader 112 is operable to remove to contribution made by the signal associated with the dominant tag 16 from the complex waveform, enabling the contributions made by the signals associated with the other tags 16 to be successively read.

If the signal associated with a less dominant tag 16 has an overall contribution of 5% of the complex waveform but the reader 112 can only estimate the effect of the signal associated with the dominant tag 16 to an accuracy of 10%, then it will not be able to determine the data signal originating from the second tag, so the reader 112, in such an embodiment, must be operable to exactly remove the effect of the signal associated with the dominant tag 16 to a high accuracy.

The microprocessor 118 of the reader 112 is operable, under control of the instructions of the dominant tag analysis software module, to read the data of the signal of the dominant tag 16 (as it is the dominant or primary signal component of the combination of data signals) to build up or construct a simulated first or dominant data signal or waveform bit by bit, matching the previous 5 bits to the new one and so on until the complete waveform of all 64 bits of the dominant tag data has been created in digital form in memory.

Once the simulation of the first data signal or waveform has been constructed, the reader 112, via action of the microprocessor 118 under control of the instructions, is operable to digitally subtract the simulated waveform from the representation (i.e. the digitised received complex/combination signal waveform on the fly), at the time each bit of data is received. Alternatively, the reader 112 may be operable to digitise and store the representation of the complex received signal in the memory and to subtract the constructed waveform from the representation of the received signal data in the memory.

This process will result in a modified representation comprising only the digitised signals of the remaining tags 16 including a second or next dominant tag 16, which can then be detected and the process can be repeated and repeated until the data originating from all of the tags 16 are read. In this manner, the data signals originating from each of the respective tags 16, and the associated data, may be isolated or identified and read.

In alternative embodiments of the invention, other methods may be used to simulate waveforms and/or perform analysis. However, the methods described are extremely fast. In this regard, the overhead per digital-analogue sample to do an analysis is a limiting factor, the data is continually changing and many calculations must be performed. The current method can be completed with a minimum time overhead and that would not be the case, if say, a 'fast transform' were used using the same amount of data points. The overhead using such techniques, even written in assembler, will be very high.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

The invention claimed is:

1. A reader for reading a plurality of data, wherein each data in the plurality of data is associated with a respective one of a plurality of radio frequency identification ("RFID") tags and is carried by a respective data signal originating from the respective one of the plurality of RFID tags, the reader comprising processing means and a storage means, the storage means having instructions stored thereon, whereby the processing means is operable, under control of the instructions, to:

receive and store in the storage means a representation of a combination of the respective data signals, the combination comprising corrupted data carried by a corrupted data signal arising from a collision involving at least one data signal originating from a conventional RFID tag having no provision for anti-collision;

process the representation to determine one or more data signals of the combination of the respective data signals of the representation, wherein the processing comprises determining voltage levels associated with the representation and allocating the voltage levels to a data signal associated with a respective one of the plurality of RFID tags, the determined one or more data signals including the data signal of the at least one data signal originating from a conventional RFID tag having no provision for anti-collision; and to read the data of the determined one or more data signals.

2. The reader of claim 1, wherein the representation comprises at least one of: a waveform; samples of a waveform; and digitized samples of a waveform.

3. The reader of claim 1, wherein the processing means is operable, under control of the instructions, to:

construct a simulation of the determined one or more data signals;

subtract the simulation from the representation to generate a modified representation; and to store the modified representation in the storage means.

4. The reader of claim 3, wherein the processing means is further operable, under control of the instructions, to:

process the modified representation to determine further one or more data signals of the combination of the respective data signals of the modified representation; and to read the data of the determined further one or more data signals.

5. The reader of claim 4, wherein the one or more data signals comprises a first data signal, and/or the further one or more data signals comprises a second data signal.

6. The reader of claim 1, wherein the voltage levels are determined by comparing successive analog to digital samples or readings and/or by calculating first and second derivatives of the representation.

7. The reader of claim 1, wherein the processing comprises comparison of the representation and allocating a data signal associated with a respective one of the plurality of RFID tags on the basis of the comparison.

8. The reader of claim 7, wherein the comparison comprises a direct comparison of a magnitude of analogue to digital samples or readings and/or of slopes of curves/rates of change (dv/dt) associated with the representation to determine directions of multiple transitions in the time domain.

9. The reader of claim 1, comprising a field generator operable to generate a field to activate an RFID tag to transmit a respective data signal carrying data associated with the RFID tag, wherein the field generator is operable to perform at least one of the following operations:

periodically cancel and re-apply the field to alter a phase distribution of the respective data signal relative to other data signals;

vary the periodic cancellation and re-application of the field;

vary an amplitude of the field to alter a phase distribution of the respective data signal relative to other data signals; and apply noise during a period in which the field is cancelled to alter a phase distribution of the respective data signal relative to other data signals.

10. The reader of claim 1, wherein the representation is associated with a remnant signal remaining after the respective data signals have combined to at least partially cancel one another.

11. The reader of claim 10, wherein the processing comprises analyzing switching directions associated with the remnant signal to determine switching directions of the respective data signals.

12. A method for reading a plurality of data, wherein each data in the plurality of data is associated with a respective one of a plurality of radio frequency identification ("RFID") tags and is carried by a respective data signal originating from the respective one of the plurality of RFID tags, the method comprising:
   receiving and storing a representation of a combination of the respective data signals, the combination comprising corrupted data carried by a corrupted data signal arising from a collision involving at least one data signal origination from a conventional RFID tag having no provision for anti-collision;
   processing the representation to determine a one or more data signals of the combination of the respective data signals of the representation, wherein the processing comprises determining voltage levels associated with the representation and allocating the voltage levels to a data signal associated with a respective one of the plurality of RFID tags, the determined one or more data signals including the data signal of the at least one data signal originating from the conventional RFID tag having no provision for anti-collision; and
   reading the data of the determined one or more data signals.

13. The method of claim 12, wherein the representation comprises at least one of: a waveform; samples of a waveform; and digitized samples of a waveform.

14. The method of claim 12, comprising:
   constructing a simulation of the determined one or more data signals;
   subtracting the simulation from the representation to generate a modified representation; and
   storing the modified representation in the storage means.

15. The method of claim 14, comprising:
   processing the modified representation to determine further one or more data signals of the combination of the respective data signals of the modified representation; and
   reading the data of the determined further one or more data signals.

16. The method of claim 15, wherein the one or more data signals comprises a first data signal, and/or the further one or more data signals comprises a second data signal.

17. The method of claim 12, wherein the voltage levels are determined by comparing successive analog to digital samples or readings and/or by calculating first and second derivatives of the representation.

18. The method of claim 12, wherein the processing comprises comparison of the representation and allocating a data signal associated with a respective one of the plurality of RFID tags on the basis of the comparison.

19. The method of claim 18, wherein the comparison comprises a direct comparison of a magnitude of analogue to digital samples or readings and/or of slopes of curves/rates of change (dv/dt) associated with the representation to determine directions of multiple transitions in the time domain.

20. The method of claim 12, comprising generating a field to activate an RFID tag to transmit a respective data signal carrying data associated with the RFID tag, and at least one of:
   periodically canceling and re-applying the field to alter a phase distribution of the respective data signal relative to other data signals;
   varying the periodic cancellation and re-application of the field;
   varying an amplitude of the field to alter a phase distribution of the respective data signal relative to other data signals; and
   applying noise during a period in which the field is cancelled to alter a phase distribution of the respective data signal relative to other data signals.

21. The method of claim 12, wherein the representation is associated with a remnant signal remaining after the respective data signals have combined to at least partially cancel one another.

22. The method of claim 21, wherein the processing comprises analyzing switching directions associated with the remnant signal to determine switching directions of the respective data signals.

23. A non-transitory computer-readable storage medium on which is stored instructions that, when executed by a microprocessor, causes the microprocessor to perform a method for reading a plurality of data, wherein each data in the plurality of data is associated with a respective one of a plurality of radio frequency identification ("RFID") tags and is carried by a respective data signal originating from the respective one of the plurality of RFID tags, the method comprising:
   receiving and storing a representation of a combination of the respective data signals, the combination comprising corrupted data carried by a corrupted data signal arising from a collision involving at least one data signal origination from a conventional RFID tag having no provision for anti-collision;
   processing the representation to determine a one or more data signals of the combination of the respective data signals of the representation, wherein the processing comprises determining voltage levels associated with the representation and allocating the voltage levels to a data signal associated with a respective one of the plurality of RFID tags, the determined one or more data signals including the data signal of the at least one data signal originating from the conventional RFID tag having no provision for anti-collision; and
   reading the data of the determined one or more data signals.

24. A microprocessor programmed to carry out a method for reading a plurality of data, wherein each data in the plurality of data is associated with a respective one of a plurality of radio frequency identification ("RFID") tags and is carried by a respective data signal originating from the respective one of the plurality of RFID tags, the method comprising:
   receiving and storing a representation of a combination of the respective data signals, the combination comprising corrupted data carried by a corrupted data signal arising from a collision involving at least one data signal origination from a conventional RFID tag having no provision for anti-collision;
   processing the representation to determine a one or more data signals of the combination of the respective data signals of the representation, wherein the processing comprises determining voltage levels associated with the representation and allocating the voltage levels to a data signal associated with a respective one of the plurality of RFID tags, the determined one or more data signals including the data signal of the at least one data signal originating from the conventional RFID tag having no provision for anti-collision; and reading the data of the determined one or more data signals.

25. A reader for reading data, the reader comprising:

a field generator operable to generate a field for activating a radio frequency identification ("RFID") tag to transmit a respective data signal carrying data associated with the RFID tag;

a receiver operable to receive:

a data signal, wherein the data signal carries one or more data associated with one or more RFID tags and is transmitted by the one or more RFID tags being maintained substantially stationary relative to the field generator for a time period and activated by the field to transmit the data; and a further data signal comprising a combination of the data signal and an other data signal carrying data associated with one or more other RFID tags transmitted by the one or more other RFID tags being placed in the field and activated by the field to transmit the data, whilst the one or more RFID tags are maintained substantially stationary relative to the field generator, the combination comprising corrupted data carried by a corrupted data signal arising from a collision involving at least one data signal originating from a conventional RFID tag having no provision for anti-collision;

processing means and a storage means, the storage means having instructions stored thereon, whereby the processing means is operable, under control of the instructions, to:

generate and store in the storage means a representation of the received data signal;

generate and store in the storage means a representation of the received further data signal;

process the representation of the received data signal and the representation of the received further data signal to determine the other data signal, wherein the processing comprises determining voltage levels associated with the representation and allocating the voltage levels to a data signal associated with a respective one of the plurality of RFID tags, the determined other data signal including the data signal of the at least one data signal originating from the conventional RFID tag having no provision for anti-collision; and to read data of the determined other data signal.

26. The reader of claim 25, wherein the processing comprises subtracting the representation of the received first data signal from the representation of the received combined data signal.

27. The reader of claim 26, wherein the subtraction is timed to occur upon a repeat of the data.

28. The reader of claim 25, wherein the data signal comprises a first data signal carrying first data associated with a first RFID tag, and/or the other data signal comprises a second data signal carrying data associated with a second RFID tag.

29. The reader of claim 25, wherein the RFID tags are not maintained substantially stationary relative to the field generator.

30. A method for reading data, the method comprising:

generating a field for activating a radio frequency identification ("RFID") tag to transmit a respective data signal carrying data associated with the RFID tag, the field being generated by a field generator;

maintaining one or more RFID tags substantially stationary relative to the field generator for a time period so that the one or more RFID tags are activated by the field to transmit a data signal carrying one or more data associated with the one or more RFID tags;

receiving the data signal;

generating and storing a representation of the received data signal;

placing one or more other RFID tags in the field so that is the one or more other RFID tags are activated by the field to transmit an other data signal carrying data associated with the one or more other RFID tags, whilst maintaining the one or more RFID tags substantially stationary relative to the field generator;

receiving a further data signal comprising a combination of the data signal and the other data signal, the combination comprising corrupted data carried by a corrupted data signal arising from a collision involving at least one data signal originating from a conventional RFID tag having no provision for anti-collision;

generating and storing a representation of the received further data signal;

processing the representation of the received data signal and the representation of the received further data signal to determine the other data signal, wherein the processing comprises determining voltage levels associated with the representations and allocating the voltage levels to a data signal associated with a respective one of the one or more RFID tags, the determined other data signal including the data signal of the at least one data signal originating from the conventional RFID tag having no provision for anti-collision; and reading the data of the determined other data signal.

31. The method of claim 30, wherein the processing comprises subtracting the representation of the received data signal from the representation of the received further data signal.

32. The method of claim 31, wherein the subtraction is timed to occur upon a repeat of the data.

33. The method of claim 30, wherein the data signal comprises a first data signal carrying first data associated with a first RFID tag, and/or the other data signal comprises a second data signal carrying data associated with a second RFID tag.

34. The method of claim 30, wherein the RFID tags are not maintained substantially stationary relative to the field generator.

* * * * *